(12) United States Patent
Li

(10) Patent No.: US 8,154,550 B2
(45) Date of Patent: Apr. 10, 2012

(54) WAVEFORM DISPLAY DEVICE AND WAVEFORM DISPLAY METHOD

(75) Inventor: Yinxiu Li, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 210 days.

(21) Appl. No.: 12/720,452

(22) Filed: Mar. 9, 2010

(65) Prior Publication Data

US 2010/0265253 A1    Oct. 21, 2010

(30) Foreign Application Priority Data

Apr. 15, 2009    (JP) ................................ 2009-098899

(51) Int. Cl.
*G09G 11/20* (2006.01)
*G09G 5/00* (2006.01)
(52) U.S. Cl. ..................................... 345/440.1; 345/629
(58) Field of Classification Search .............. 345/440.1, 345/629
See application file for complete search history.

(56) References Cited

FOREIGN PATENT DOCUMENTS

| JP | 1167623 U | 11/1989 |
|---|---|---|
| JP | 05126854 A | 5/1993 |
| JP | 2004085501 A | 3/2004 |
| JP | 2008-070295 A | 3/2008 |

OTHER PUBLICATIONS

Japanese Office Action corresponding to Japanese Patent Application No. 2009-09889, dated Mar. 25, 2011.

*Primary Examiner* — Ryan R Yang
(74) *Attorney, Agent, or Firm* — Sughrue Mion, PLLC

(57) ABSTRACT

The invention aims to implement a waveform display device capable of visibly displaying a comparison waveform in an arbitrary range and a waveform display method. The waveform display device for executing waveform display of waveform data on a display section comprises an input section for inputting at least two data ranges of the waveform data, and comparison waveform display means for executing waveform display of the waveform data while overlaid on one another on the display section based on at least two data ranges inputted by the input section.

6 Claims, 7 Drawing Sheets

WAVEFORM DISPLAY DEVICE AND WAVEFORM DISPLAY METHOD

FIELD OF THE INVENTION

The invention relates to a waveform display device for executing waveform display of waveform data on a display section and a waveform display method, particularly to a waveform display device for displaying waveforms in arbitrary ranges for every waveform visibly on the display section, and a waveform display method.

BACKGROUND OF THE INVENTION

In various factories and experimental facilities, when data sampled by a waveform measurement device and so forth are subjected to waveform display in there is a case where waveform comparison is needed between periodically changed waveforms in at not less than two specified ranges. For example, there are cases of comparison of waveform data of periodic voltage obtained by an oscilloscope, and so forth, daily comparison of yields of production in a chemical plant using a trend graph, comparison between quantity of production at daytime shift and that at night shift in a rotating shift system in a factory using the trend graph, and so forth. Although a method of comparing not less than two waveforms is, for example, illustrated in a patent document 1 set forth hereunder, the waveforms to be compared are limited to a present waveform and a past waveform, so that waveforms at not less than two arbitrary time zones can not be compared with each other. In the past, when the waveforms in at not less than two arbitrary specified ranges are compared, the respective waveforms are allowed to be displayed on two display windows, and two display windows are arranged one above the other, thereby executing comparison of two waveforms.

A waveform display device for executing waveform display of waveforms in at not less than two specified ranges is now described with reference to FIG. 6. In FIG. 6, waveform data obtained by a measurement device of an oscilloscope and so forth (not shown) is stored in a storage section 101. An input section 102 is a mouse, keyboard and so forth and executes input. A display section 103 is a monitor and so forth and executes waveform display and so forth. A control section 104 is connected to the storage section 101, input section 102, display section 103 and has waveform display means 105. The waveform display means 105 executes waveform display of waveform data stored in the storage section 101 on the display section 103 by the input of the input section 102.

Operations of the waveform display device shown in FIG. 6 are now described hereunder. FIG. 7 is a sample of display of waveform data stored in the storage section 101. A waveform serving as a standard of comparison at a time zone between 8:00 of the 29th to 0:00 of the next day is displayed on a waveform window 111. A waveform at a time zone between 8:00 of the 30th to 0:00 of the next day is displayed on a waveform window 112.

Waveform data are obtained by a measurement device such as an oscilloscope and so forth and are stored in the storage section 101. A user operates the control section 104 by the input section 102, and reads out the waveform data stored in the storage section 101, and displays the display windows 111, 112 side-by-side on the display section 103. Comparison of the waveform data is executed by displaying the display windows 111, 112 side-by-side on the display section 103.

[Patent Document] JP 2008-70295A

Although it is possible to compare waveforms in arbitrary ranges, since the waveforms are displayed by use of a plurality of display windows, as the number of ranges of the waveforms to be compared is increased, the waveform area of one display window is narrower, causing a problem that the waveforms are difficult to be seen.

SUMMARY OF THE INVENTION

It is therefore an object of the invention to implement a waveform display device capable of visibly displaying a comparison waveform in an arbitrary range and a waveform display method.

To achieve the above object, the waveform display device for executing waveform display of waveform data on a display section, according to the first aspect of the invention, comprises an input section for inputting at least two data ranges of the waveform data, and comparison waveform display means for executing waveform display of the waveform data while overlaid on one another on the display section based on at least two data ranges inputted by the input section.

The waveform display device may further comprise waveform display means for executing waveform display of the waveform data on the display section, and displaying time periods of the data ranges on the display in response to an instruction from the input section.

The comparison waveform display means may execute waveform display of the waveform data while changing types of lines or colors for every data range.

The comparison waveform display means may display time of time data and data value of the waveform data on the display section in response to an instruction from the input section.

A waveform display method for executing waveform display of waveform data on a display section, according to a second aspect of the invention, comprises inputting at least two data ranges of the waveform data by an input section and executing waveform display of the waveform data in at least two data ranges while overlaid on one another on the display section.

The waveform display method may further comprise executing waveform display of the waveform data on the display section, and executing waveform display of time periods of the data ranges in response to an instruction from the input section.

According to the invention, there are following advantages. According to the first aspect of the invention, at least two data ranges of the waveform data are inputted by the input section, and the comparison waveform display means executes waveform display of the waveform data while overlaid on one another on the display section based on the data range, so that a comparison waveform in an arbitrary range can be visibly displayed, facilitating the comparison with ease.

According to the second aspect of the invention, the same effect as the first aspect of the invention can be achieved.

PREFERRED EMBODIMENT OF THE INVENTION

Figure 1:
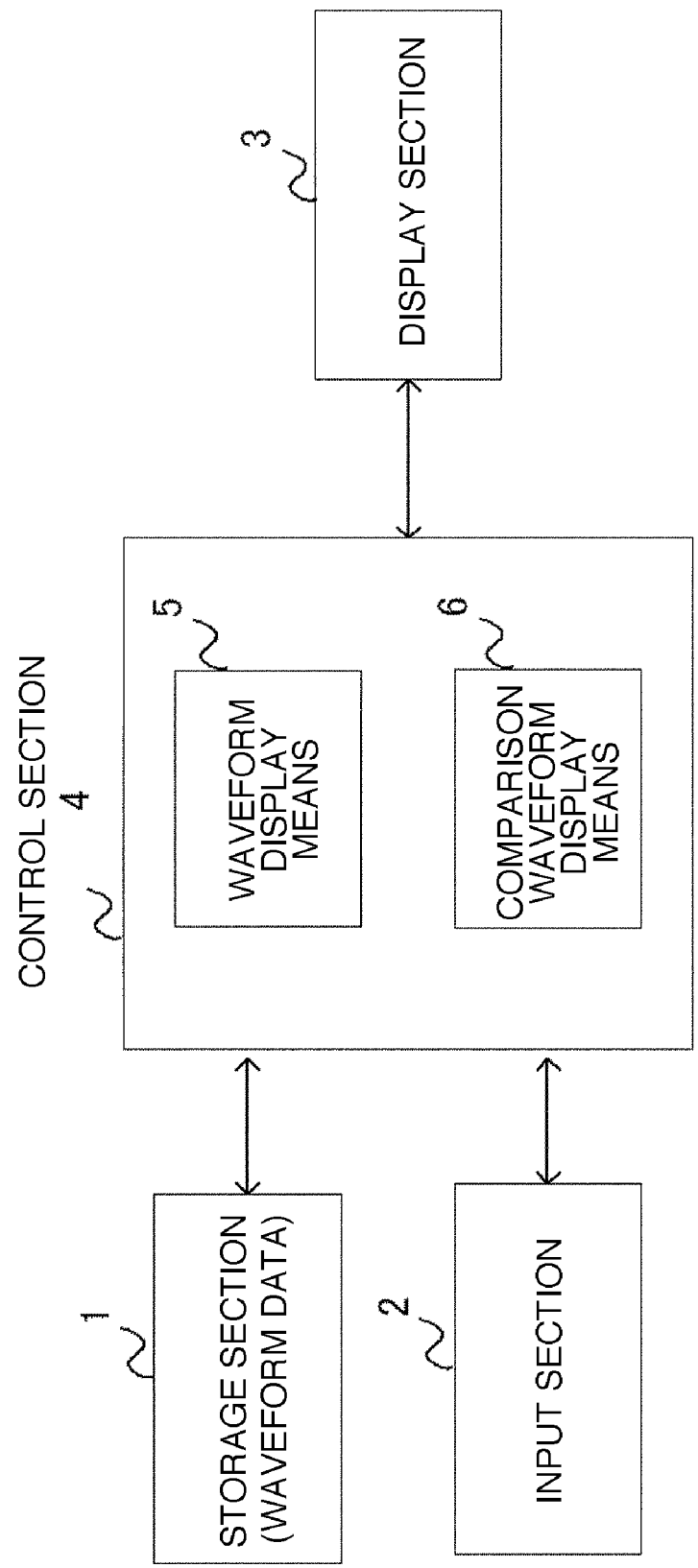
FIG. 1 is a view showing a configuration of an embodiment of a waveform display device according to the invention.

The invention is now descried in detail with reference to the attached drawings. FIG. 1 is a view showing a configuration of an embodiment of a waveform display device according to the invention.

In FIG. 1, a storage section 1 stores therein time series waveform data measured by a measurement device (not shown) such as an oscilloscope, and so forth. Here, the waveform data comprises a plurality of time data and data values. An input section 2 is a mouse, a keyboard and forth, and inputs at least two data ranges of the waveform data, and so forth. A display section 3 is a monitor and so forth for executing waveform display.

A control section 4 is connected to the storage section 1, input section 2 and display section 3, and comprises waveform display means 5 and comparison waveform display means 6. The waveform display means 5 executes the waveform data stored in the storage section 1 on the display section 3 and displays time periods of data ranges inputted by the input section 2. The comparison waveform display means 6 executes waveform display of the waveform data stored in the storage section 1 while overlaid on one another on the display section 3 based on the data ranges inputted by the input section 2.

Operations of the waveform display device having the configuration set forth above are now described hereunder. FIGS. 2 to 5 are views showing examples of display of the display section 3. Here, a vertical axis in each figure shows a data value, and a lateral axis shows time. Described hereinafter is the case where two data ranges are selected but not less than three data ranges may be selected.

Figure 2:
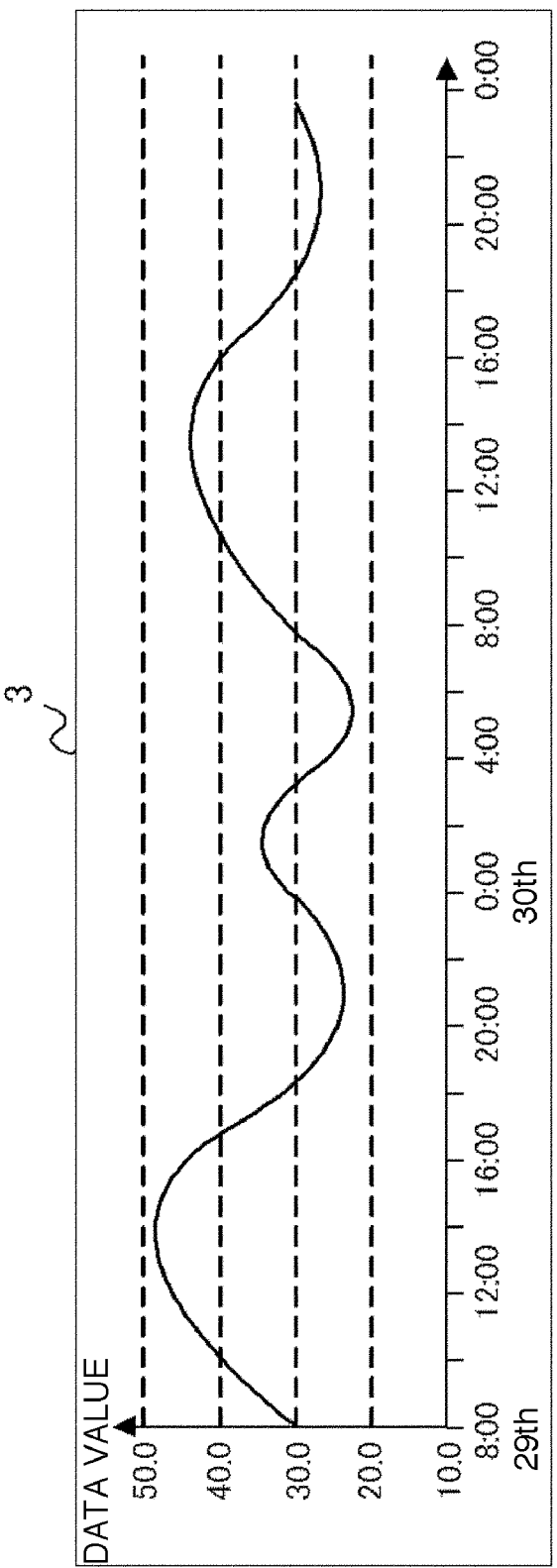
FIG. 2 is a view showing an example of display by the waveform display device shown in FIG. 1.
Figure 3:
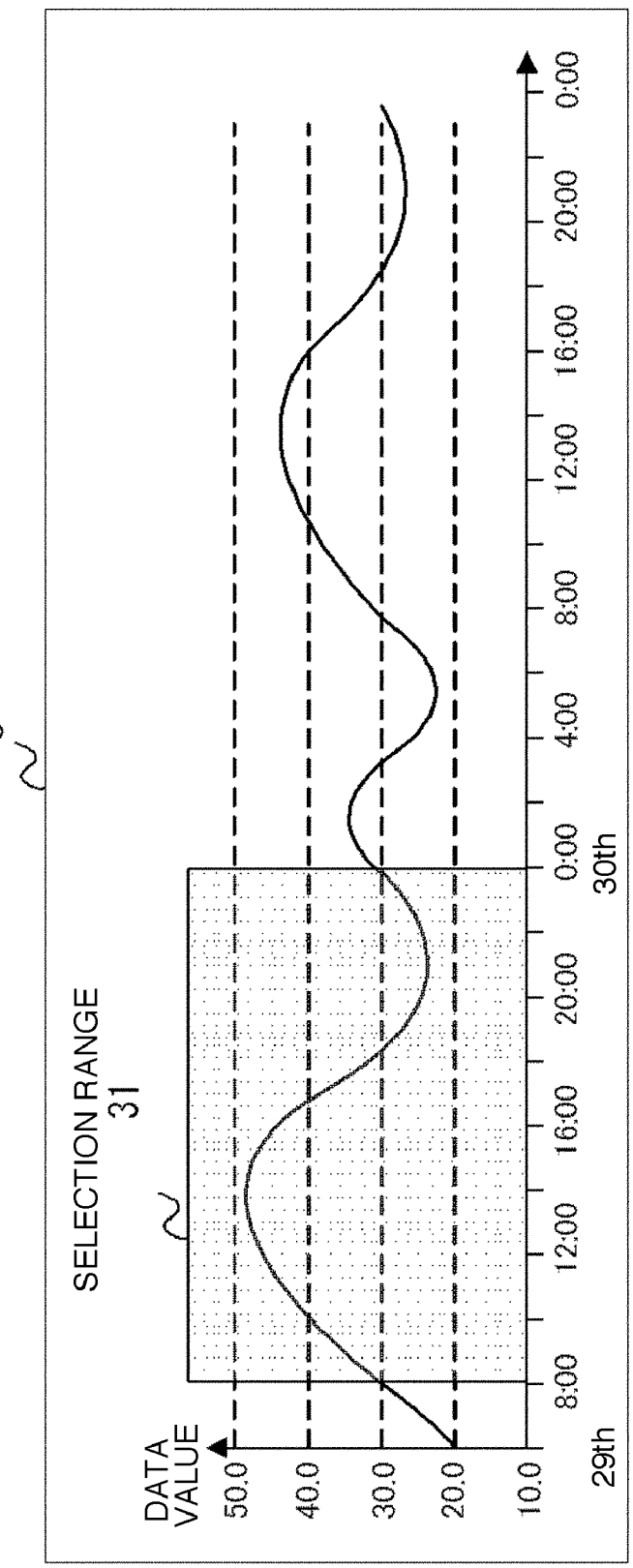
FIG. 3 is a view showing another example of display by the waveform display device shown in FIG. 1.
Figure 4:
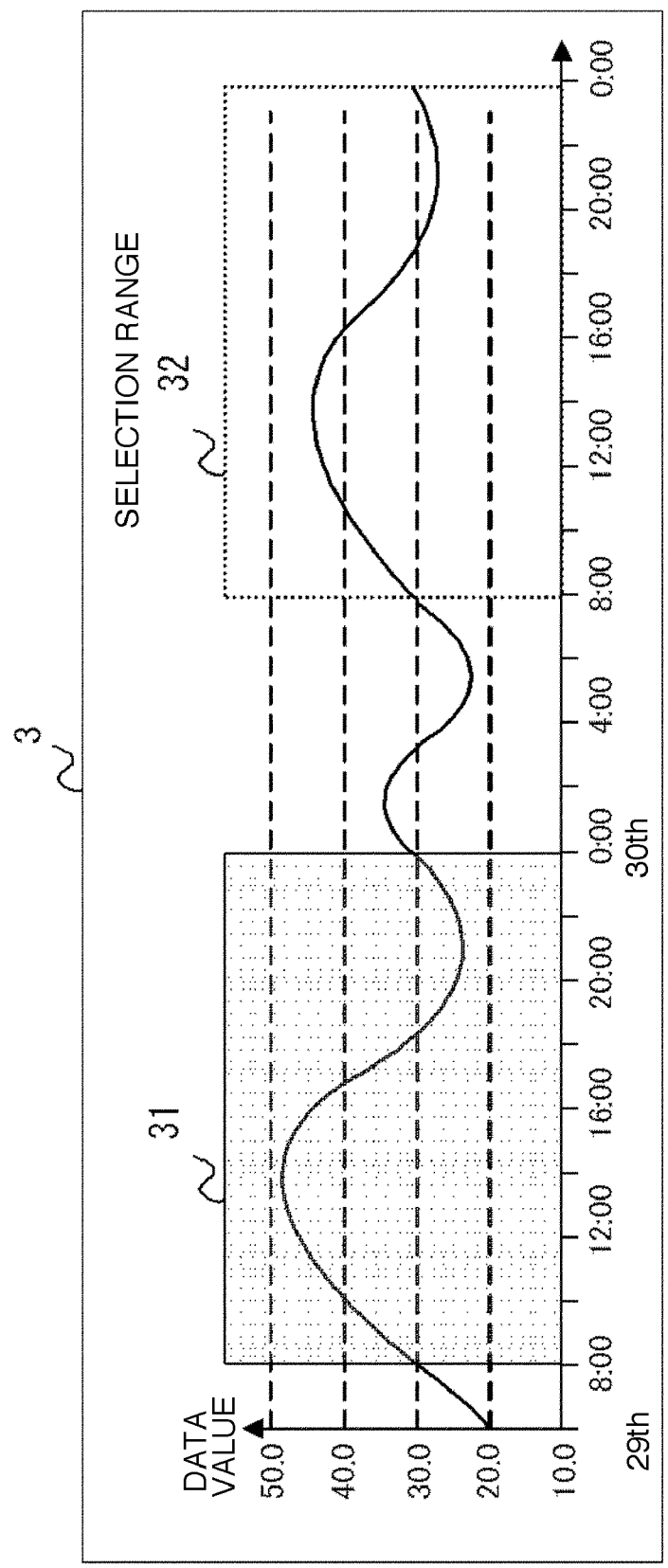
FIG. 4 is a view showing a still another example of display by the waveform display device shown in FIG. 1.
Figure 5:
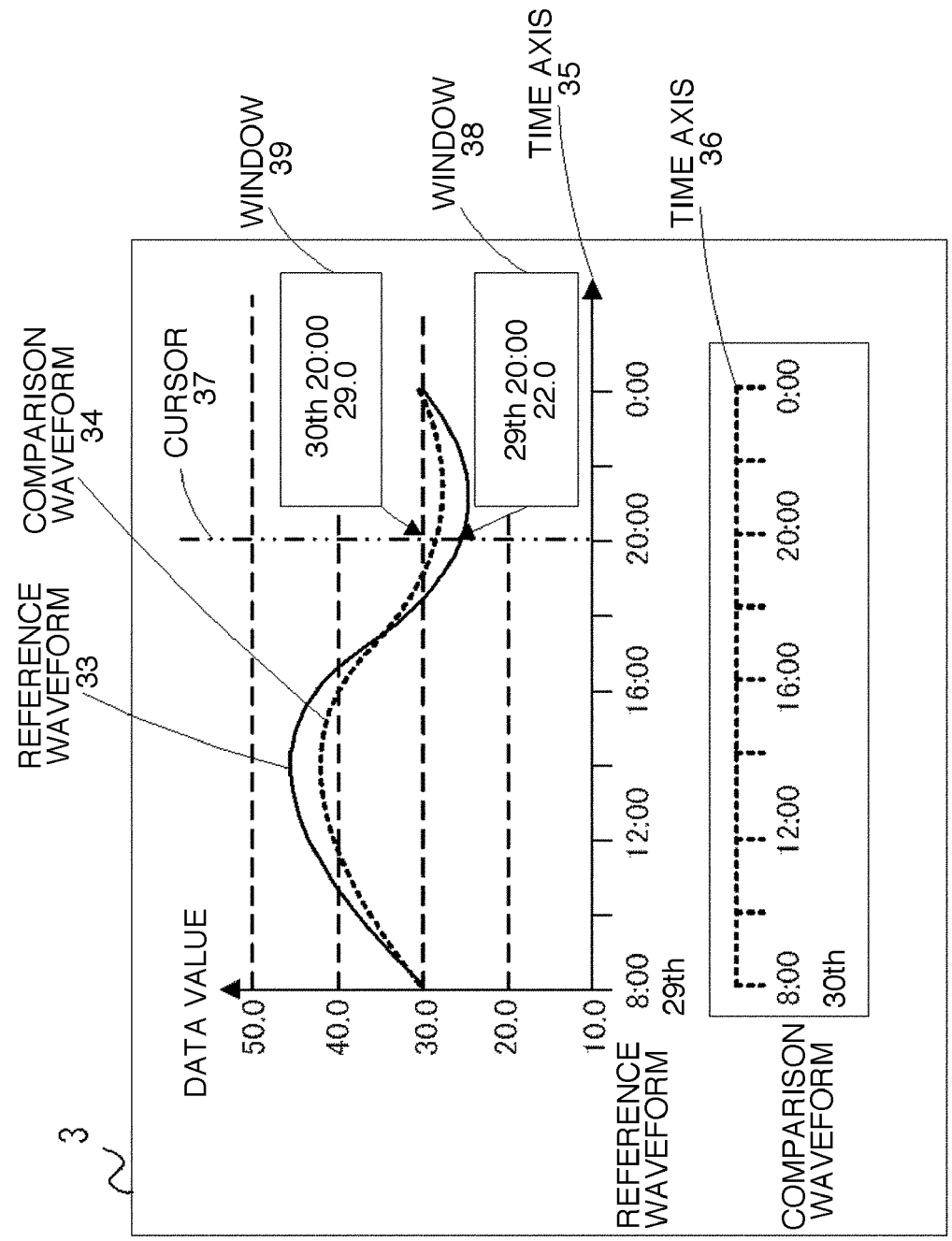
FIG. 5 is a view showing a yet another example of display by the waveform display device shown in FIG. 1.
Figure 6:
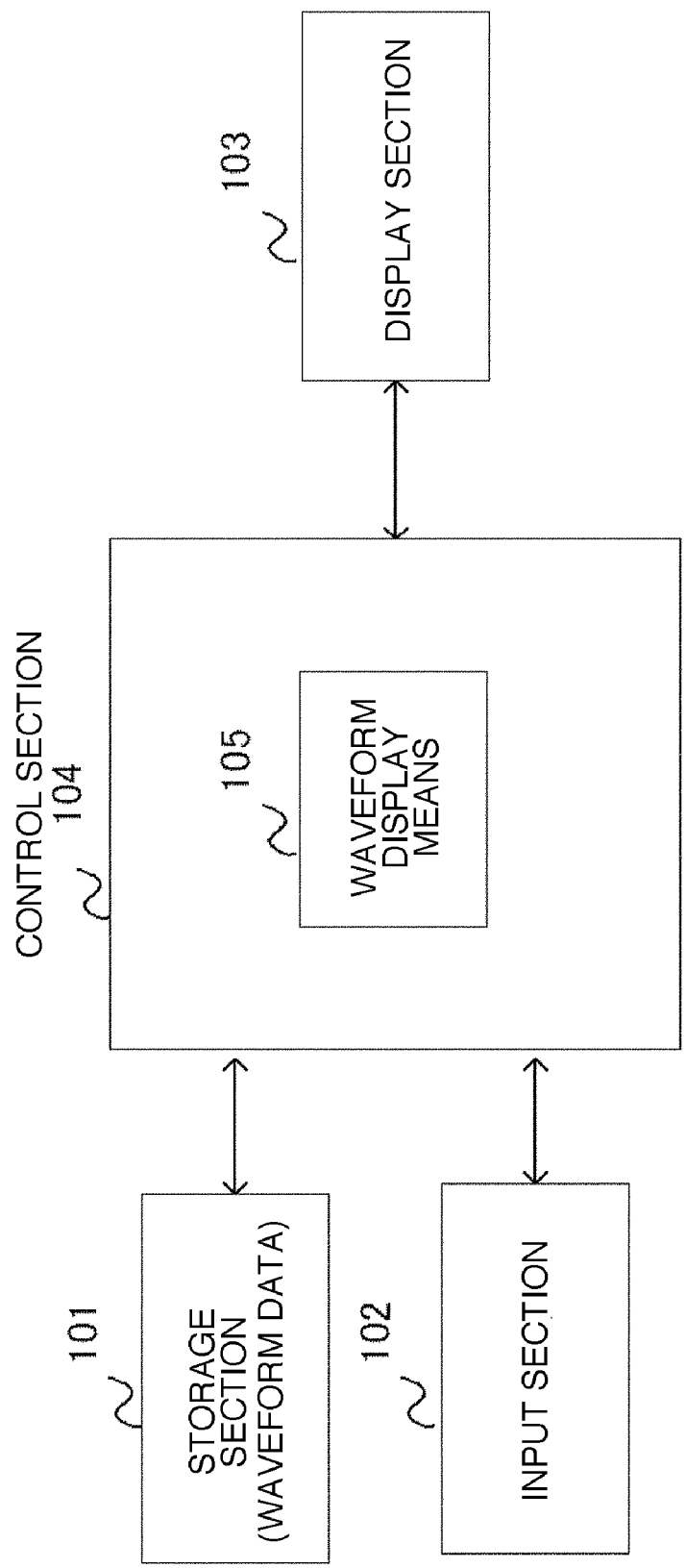
FIG. 6 is a view showing a configuration of a conventional waveform display.
Figure 7:
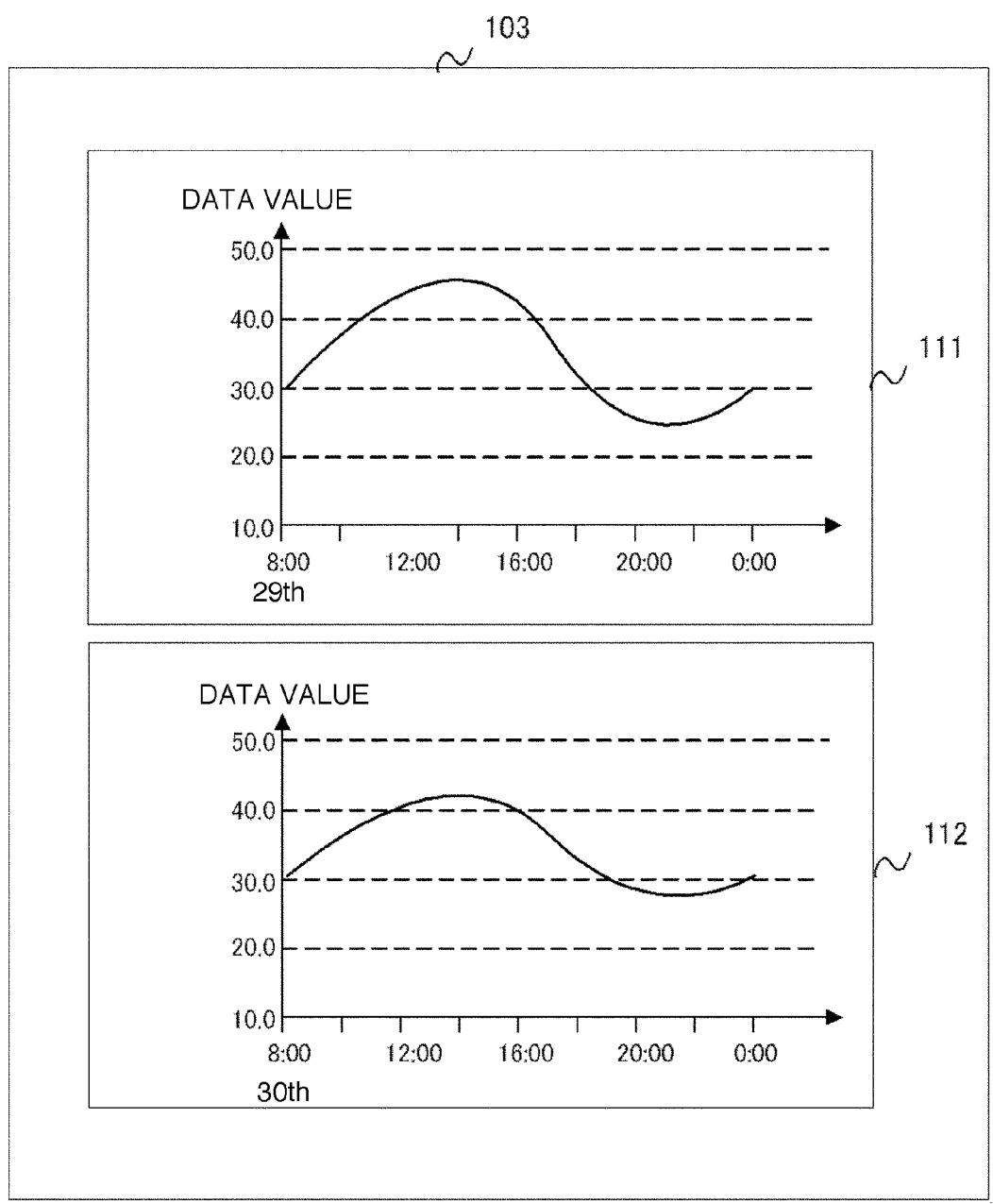
FIG. 7 is a view showing an example of display by the waveform display device shown in FIG. 6.

Waveform data are obtained by a measurement device such as an oscilloscope and so forth and stored in the storage section 1. A user operates the control section 4 by the input section 2 so as to allow the waveform data stored in the storage section 1 to be displayed on the display section 3 by the waveform display means 5 (FIG. 2). The user selects the waveform data, in an arbitrary range, of the waveform data, by the input section input section 2, which data serves as a standard of comparison and is depicted as a selection range 31 (FIG. 3). In the selection range 31, a time zone between 8:00 of the 29th to 0:00 of the next day is selected. A data range to be subjected to comparison is selected by the input section 2 and is depicted by a selection range 32 (FIG. 4). In the selection range 32, a time zone between 8:00 of the 30th to 0:00 of the next day is selected. The comparison waveform display means 6 reads out the waveform data in the selection ranges 31 and 32 from the storage section 1, and display these waveform data as a reference waveform 33 and a comparison waveform 34 while overlaid on one another on the display section 3 by a solid line and a broken line, as shown in FIG. 5. Further, the comparison waveform display means 6 displays a time axis 35 relative to the reference waveform 33 and a time axis 36 relative to the comparison waveform 34, respectively.

Further, the control section 4 is controlled by the input section 2 so that a cursor on a screen of the display section 3 is aligned with the reference waveform 33 or the comparison waveform 34, thereby data at the positions crossing the cursor 37 are displayed on the windows 38, 39, respectively. That is, time data and data value are displayed on the windows 38, 39, respectively.

In this manner, at least two data ranges of the waveform data are inputted by the input section 2, and the comparison waveform display means 6 executes waveform display of the waveform data while overlaid on one another on the display section 3, thereby visibly displaying the comparison waveform in the arbitrary range and capable of comparing these waveforms with ease.

The invention is not limited to the foregoing embodiment. For example, although there is explained the case where the arbitrary range serving as a standard of comparison is specified by a staring point and an ending point of the waveform data, it may be specified by the staring point and a time period, a middle point and the time period or the ending point and the time period, and so forth.

Further, although the comparison waveform display means 6 is configured to display the reference waveform 33 and the comparison waveform 34 while changing the types of lines of the waveforms, but they may be configured by the same line of the waveforms or changing colors of the waveforms.

The invention claimed is:

1. A waveform display device for executing waveform display of waveform data on a display section comprising:
    an input section for inputting at least two data ranges of the waveform data; and
    comparison waveform display means for executing waveform display of the waveform data while overlaid on one another on the display section based on at least two data ranges inputted by the input section, and displaying time axes relative to each waveform data.

2. The waveform display device according to claim 1 further comprising waveform display means for executing waveform display of the waveform data on the display section, and displaying time periods the data ranges on the display section in response to an instruction from the input section.

3. The waveform display device according to claim 1, wherein the comparison waveform display means executes waveform display of the waveform data while changing types of lines or colors for every data range.

4. The waveform display device according to claim 1, wherein the comparison waveform display means displays time of time data and data value of the waveform data on the display section in response to an instruction from the input section.

5. A waveform display method for executing waveform display of waveform data on a display section comprising inputting at least two data ranges of the waveform data by an input section and executing waveform display of the waveform data in at least two data ranges while overlaid on one another on the display section and displaying time axes relative to each waveform data.

6. The waveform display method according to claim 5, further comprising executing waveform display of the waveform data on the display section, and executing waveform display of time periods of the data ranges in response to an instruction from the input section.

* * * * *